(12) United States Patent
Yamamoto

(10) Patent No.: US 7,067,164 B2
(45) Date of Patent: *Jun. 27, 2006

(54) **METHOD FOR PRODUCING *KOJI* FEED COMPOSITION USING OILS**

(75) Inventor: Masahiro Yamamoto, Kogoshima-ken (JP)

(73) Assignee: Noriko Yamamoto, Kagoshima-Ken (JP)

( * ) Notice: Subject to any disclaimer, the term of this patent is extended or adjusted under 35 U.S.C. 154(b) by 193 days.

This patent is subject to a terminal disclaimer.

(21) Appl. No.: 10/371,972

(22) Filed: Feb. 21, 2003

(65) Prior Publication Data

US 2003/0157215 A1    Aug. 21, 2003

(30) Foreign Application Priority Data

| Feb. 21, 2002 | (JP) | ............................. 2002-045464 |
| Feb. 6, 2003 | (SG) | ............................. 200300333-2 |
| Feb. 11, 2003 | (AU) | ............................. 2003200468 |
| Feb. 14, 2003 | (NZ) | ..................................... 524182 |
| Feb. 19, 2003 | (EP) | ................................. 03100374 |
| Feb. 19, 2003 | (TH) | ..................................... 080185 |
| Feb. 21, 2003 | (CN) | ............................. 03 1 05461 |

(51) Int. Cl.
*A23K 1/10*    (2006.01)

(52) U.S. Cl. ..................... 426/53; 426/54; 426/635; 426/807

(58) Field of Classification Search .................. 426/53, 426/54, 635, 807
See application file for complete search history.

(56) References Cited

U.S. PATENT DOCUMENTS

| 3,272,633 | A | | 9/1966 | Clickner |
| 4,018,650 | A | | 4/1977 | Busta et al. |
| 4,298,621 | A | | 11/1981 | Samis et al. |
| 5,707,856 | A | | 1/1998 | Higa ........................... 435/262 |
| 5,853,779 | A | * | 12/1998 | Takebe et al. ................. 426/20 |
| 6,613,365 | B1 | * | 9/2003 | Yamamoto .................... 426/53 |
| 6,623,771 | B1 | * | 9/2003 | Yamamoto .................... 426/53 |
| 6,703,054 | B1 | * | 3/2004 | Yamamoto ...................... 426/7 |
| 2002/0054935 | A1 | | 5/2002 | Yamamoto |
| 2003/0012847 | A1 | | 1/2003 | Yamamoto |

FOREIGN PATENT DOCUMENTS

| EP | 0357320 | | 3/1990 |
| EP | 1174041 | * | 1/2002 |
| GB | 1489592 | | 10/1977 |
| JP | 49-27790 | | 7/1974 |
| JP | 53-69178 | | 6/1978 |
| JP | 53-86377 | | 7/1978 |
| JP | 57-71370 | | 5/1982 |
| JP | 57-174061 | | 10/1982 |
| JP | 58-190356 | | 11/1983 |
| JP | 60-260489 | | 12/1985 |
| JP | 62-179352 | | 8/1987 |
| JP | 62-179353 | | 8/1987 |
| JP | 62-179353 | A1 | 8/1987 |
| JP | 64-020090 | | 1/1989 |
| JP | 1020090 | * | 1/1989 |
| JP | 1-240148 | A1 | 9/1989 |
| JP | 01-240148 | A1 | 9/1989 |
| JP | 03-147750 | | 6/1991 |
| JP | 04-131047 | | 5/1992 |
| JP | 06-070742 | | 3/1994 |
| JP | 06-078686 | | 3/1994 |
| JP | 07-075563 | | 3/1995 |
| JP | 07-231772 | | 9/1995 |
| JP | 08-000181 | | 1/1996 |
| JP | 08-214822 | | 8/1996 |
| JP | 2000-316484 | | 11/2000 |
| JP | 2002-336822 | | 11/2002 |
| WO | 00/67588 | | 11/2000 |
| WO | 0067588 | * | 11/2000 |

OTHER PUBLICATIONS

English Language Translation of Japanese Patent Application, First Publication No. S62-179353.
English Language Translation of Japanese Patent Application, First Publication No. H01-240148.
English Language Translation of Japanese Patent Application, First Publication No. S64-20090.

* cited by examiner

*Primary Examiner*—C. Sayala
(74) *Attorney, Agent, or Firm*—Darby & Darby

(57) ABSTRACT

Means are offered for making effective use of organic wastes and waste oils from the food industry, food processing industry, livestock industry and the like. Furthermore, a method for treating wastes without generating any malodorous fumes, and a feed composition with high nutritional value, promoting the health and fattening of livestock, are offered. An organic raw material such as raw garbage, livestock manure, seafood processing industry waste, distillatory effluents or the like is immersed in a heated oil and extracted to perform an oil treatment, then added to koji and allowed to ferment. The fermentation by the koji mold causes the oil content to fall to a predetermined amount, while the heat of fermentation is used to reduce the water content of organic raw materials, thus producing a koji feed composition.

14 Claims, No Drawings

METHOD FOR PRODUCING *KOJI* FEED COMPOSITION USING OILS

BACKGROUND OF THE INVENTION

The present invention relates to a method for producing a feed composition, and more specifically relates to a method for producing a koji feed composition capable of producing a koji feed composition from an oil-treated organic raw material. The present invention further relates to a feed composition produced by this method.

Currently, almost all waste from the food industry and food processing industry is discarded.

This type of waste contains large amounts of organic matter, which would be better reused as a form of recycling. In fact, such waste is sometimes used quite effectively as fertilizer.

However, such waste normally has a high water content, and has the drawbacks of being difficult to store or transport, and easily spoiling. For this reason, this type of waste is often not put to effective use, being left to decompose, or being illegally dumped, which can lead to soil and groundwater contamination or to contamination of river water.

On the other hand, there are methods for using microbes to make fertilizer out of such raw garbage, but such microbes usually cannot function effectively on raw garbage containing large amounts of oils, thus restricting the range of raw garbage capable of being processed.

Additionally, although microbial processing of garbage usually depends on the use of thermophilic bacteria, the use of thermophilic bacteria can reduce the amount of organic matter capable of being effectively used, most of it being converted into carbon dioxide and water and released into the atmosphere.

In Kagoshima prefecture, 200,000 tons of distillatory effluents from shochu are dumped into the ocean each year. While these shochu effluents have a water content of at least 95% and are extremely susceptible to spoilage, they contain beneficial amino acids originating in yeasts, and are expected to be capable of being used effectively in feed compositions. In order to reduce the level of spoilage enough for stable use as a feed composition, the water content must be reduced by drying to 20% or less. However, shochu effluents have a high viscosity, and conventional thermal drying techniques have a very low heat utilization rate of 15% or less, making them difficult to put to any practical use.

On the other hand, the present applicant has developed a technique wherein koji mold is grown in wheat bran and used to decompose cooking oil waste, producing heat of fermentation which can be used to very efficiently dry the shochu effluents.

BRIEF SUMMARY OF THE INVENTION

The present invention has been achieved in view of the above considerations, and has the primary purpose of offering novel means for making effective use of waste.

Additionally, the present invention has the object of offering a method of producing a koji feed composition wherein waste is processed to produce a koji feed composition.

Furthermore, the present invention also has the object of offering a koji feed composition produced by the said method. For the purposes of the present invention, a koji feed composition is a feed composition produced by growing koji mold in a raw material, particularly one in which koji mold is grown dominantly.

The method for producing a feed composition according to the present invention comprises steps of performing an oil treatment by immersing at least a portion of an organic raw material in heated oil and extracting; adding koji to ferment; reducing the oils to a predetermined amount by fermentation by the koji mold while making use of the heat of fermentation to reduce the water content of the organic raw material to at most a predetermined amount.

In the present invention, "organic raw material" refers primarily to organic wastes.

This method offers the benefit of enabling raw garbage, livestock manure and the like, which have conventionally been discarded, to be put to effective use.

Furthermore, since the method of the present invention uses koji, the processing is requires little time and is efficient.

Furthermore, as opposed to treatments using thermophilic bacteria, the method of the present invention uses koji mold, so that while some of the organic matter is broken down into carbon dioxide and water, most of it is synthesized into beneficial microbial proteins, while also secreting large amounts of digestive enzymes which assist in digestive absorption. As a result, a feed composition with high nutritional value which is suitable for feeding to livestock and the like is obtained. That is, while the treatment of organic wastes using microbes is conventionally for the purpose of simply decomposing the wastes, the method of the present invention allows for useful ingredients to be generated by the koji mold, thus enabling the wastes to be reused in the useful form of a feed composition.

Furthermore, the present invention offers a method for treating wastes which does not produce any malodorous fumes.

Additionally, the present invention offers a koji feed composition which promotes the fattening of livestock and provides good meat quality.

The present invention requires an oil treatment in the process of producing a fermented koji feed composition out of organic raw materials using koji mold. The oil treatment is performed by immersing at least a portion of an organic raw material in heated oil and extracting. Preferably, all of the organic raw material is oil-treated. The oil treatment can be used to absorb oils into at least the areas around the surfaces of the organic raw materials.

Due to the inclusion of oils, the koji mold can consume the oils and convert them efficiently to heat of fermentation, so that there is no need especially to add any nutrients for growth of the koji mold, and the oils act as an energy source to greatly improve the organic raw material decomposing and drying speed of the koji mold. Furthermore, there are few microbes capable of feeding off oils in nature, thus enabling the koji mold, which is relatively susceptible to contamination by other stray microbes, to maintain dominance.

The heating treatment by oil immersion, in addition to the above effects, also has the effect of reducing weight by reducing moisture and/or sterilizing the raw material. Furthermore, the use of organic wastes treated by this method enables the production of malodorous fumes to be largely reduced as compared with conventional treatments of organic wastes using koji mold, with only the pleasant smell of koji being noticeable. If performed for the purpose of sterilization, the temperature of the oil should preferably be at least 60° C., and more preferably at least 70° C. As a result, the temperature of the waste itself should preferably be heated to about 60–100° C. and more preferably 70–100° C. The raw materials treated in this temperature range are most suitable for koji fermentation. If the purpose is to reduce moisture, the temperature of the oils should preferably be about 80–130° C. The effects of weight reduction, moisture reduction and sterilization provided by this heat treatment allow for the easy movement and transport of the organic waste and obviate the need for refrigeration in brining the organic waste to the next stage of koji processing.

The oils are preferably vegetable or animal oils, and should preferably be edible oils. While the smell can often cause an aversion to treatment of raw garbage, these heat treatments, especially those using frying oils, result in the normal smell of deep frying, which allows for processing even in restaurants or the like, with the added advantage of being readily handled. Furthermore, the oil is preferably a waste oil, thus allowing simultaneously for processing of waste oils.

Additionally, examples of koji mold include *Asp. oryzae*, *Asp. awamori*, *Asp. sojae* and the like, of which *Asp. oryzae kawachii* and *Asp. awamori kawachii* (available from Kirishima Kogen Beer KK) are preferred. Normally, organic wastes such as raw garbage contain large amounts of oils and therefore cannot be processed in conventional composting plants, being the type of waste which is most avoided. However, by using these types of koji mold, the high lipolytic capabilities allow for superior processing of the above-described oil-treated wastes. Additionally, they can be used in combination with other types of molds which are suitable for decomposition.

Moreover, as the koji mold grows and fermentation begins, the heat of fermentation causes the wastes to dry so as to obtain a koji feed composition of a desired water content or less. At this time, the speed and level of drying can be improved by blowing hot air as needed. The final water content of the koji feed composition is preferably at most 30 wt %, more preferably at most 20 wt %, and even more preferably at most 15 wt %.

Furthermore, the present invention offers a koji feed composition obtained by the above-described production method. This koji feed composition has an extremely high nutritional value, and is suitable for feeding to livestock such as cattle, swine, fowl and the like. Since the koji mold uses oils as an energy source, the oils are consumed and thereby reduced. Moreover, lipolytic enzymes from the koji mold will also be contained in the feed material. While the overabundance of oils can cause diarrhea in livestock, this problem can be completely overcome by the presence of lipolytic enzymes, thus raising the nutritional value of feed compositions and promoting the fattening of livestock. Furthermore, the action of the koji mold causes large amounts of enzymes such as amylases, proteases and active oxygen decomposing enzymes to be accumulated in the feed composition, thus largely assisting in digestion by the livestock fed this feed composition, thereby also reducing stress. The feed composition also has the effect of suppressing the smell of the manure of the livestock.

Furthermore, feeding a feed composition containing large amounts of unsaturated fatty acids to livestock can cause reduced meat quality such as yellowing, but treating with koji mold can reduce the amount of unsaturated fatty acids, so that livestock fed on such a feed composition will be of high meat quality.

DETAILED DESCRIPTION OF THE INVENTION

Herebelow, preferred embodiments of the present invention shall be described.

First, in the present invention, the organic raw material is a raw material preferably composed primarily of an organic waste. Possible examples of waste capable of being used as the organic raw material include food industry waste, household garbage, food processing waste, livestock waste, manure, and waste from quarantine stations. Any such waste can be selected, and they can be used alone or in combination. This type of waste contains amino acids in abundance, which raises the nutritional value of the feed composition.

Food industry waste and household garbage include, for example, cooking scraps, leftovers and the like.

Food processing waste includes, for example, fish broth, fish viscera and the like from the processing of seafood, separated and removed from the whole fish and conventionally discarded during the processing of seafood. There is no particular restriction as to the parts of the body. The low melting point unsaturated fatty acids contained in seafood are highly rated as growth promoting factors, and these can be put to effective use.

Livestock waste includes all wastes produced in the raising of livestock, as well as carcasses and the like.

Additionally, the manure which is used can be the excreta from livestock, including cattle, horses, fowl and the like produced in the livestock industry, as well as the excreta of other animals and even humans.

Aside from such wastes, the organic raw material can include tofu lees, cereals or the like.

Once the raw material is obtained, it is next oil-treated.

The oil used here may be of any type which is edible and readily available, such as frying oil, lard, soy oil, meat factory waste oil, olive oil or the like, but frying oils are preferable for being readily available from restaurants and the like and easily handled. Since koji mold secretes a lipolytic enzyme which can break down oils which are insoluble in water into water-soluble fatty acids which can then be taken into the cell and used, it can decompose both vegetable and animal oils. Additionally, as is well known, waste oils are being more and more recognized as being a form of industrial waste whose treatment is turning into a problem of major concern in terms of the possibility for pollution. By using the above-described oils as waste oils, this problem can be effectively resolved.

The oil treatment can be performed by a method similar to that normally used for deep frying, that is, by immersing at least a portion of an organic raw material in an oil adjusted to an appropriate temperature for a predetermined period of time, then extracting. The temperature of the oil may be set according to the purpose. For example, if the purpose is to evaporate the moisture, a temperature of about 80–130° C. is preferable, whereas if the purpose is sterilization, a temperature of at least about 70° C. is sufficient. The organic raw material will contain oils in at least the areas near the surface, and the organic raw material can be used directly after extraction, but the oil content of the organic raw material should preferably be adjusted, for example, by raising in a sieve, pressing out the oils or adding oils, to at least about 3 wt %, preferably at least 5 wt %, and more preferably at least 10 wt % with respect to the overall water content of the organic raw material. While all of the organic raw material should preferably be oil-treated in order to prevent the intermixture of stray microbes, some raw material which has not been oil-treated may also be mixed in.

Koji is then mixed with the organic raw material, preferably after having reached an appropriate temperature. Preferably, the raw material is added to koji.

The method for obtaining a feed composition by fermenting the koji mold may rely on any method which is conventionally known. For example, there is a method of a) adding the raw material to koji and mixing well, b) continuing to stir while maintaining a temperature of about 30–50° C. using a static aerating koji producing apparatus to allow fermentation until the water content is reduced to 20 wt % or less, and c) adding more raw material to raise the water content of the mixture to 20–35 wt % and allowing further fermentation and drying, and repeating steps b) and c) a suitable number of times until a koji feed composition with a water content of 20 wt % or less is obtained.

In this case, the water content at step a) should preferably be 50 wt % or less, more preferably 25–40 wt %. The water content can be adjusted by any method. For example, the water content can be reduced in the above-described oil-heating step of the present invention, by mixing in other types of waste which are relatively dry, such as sawdust, wood shavings, wheat bran, rice bran, beet pulp, hay, or dry koji feed composition already produced by the above-described method, or by drying by letting stand, blowing warm air or sun-drying. In the case where another substance is added for mixing, the starch content should preferably be at least 40%, and they should be used in combination. Conversely, if overly dry due to the oil treatment or the like, the water content may be raised by adding vegetable scraps, water or the like. Thus, the water content of the oil-treated organic raw material is not particularly restricted.

The koji mold used in the present invention can be of any type which is conventionally used to produce koji, specifically *Aspergillus* or *Monascus*, preferably *Asp. oryzae, Asp. awamori, Asp. sojae*, and more preferably *Asp. oryzae kawachii* and *Asp. awamori kawachii* (available from Kirishima Kogen Beer KK) which have the property of having a high lipolytic ability, these being capable of being used in combination with other molds or the like.

Heat is generated with the growth of koji mold immediately after the koji mold is added, with the product temperature gradually rising.

Subsequently, the product should preferably be maintained at 35–50° C. in an isothermic tank, for which purpose cooling by aeration is effective. Furthermore, blowing air heated to 50–60° C. is effective for drying.

When the koji mold begins fermentation, the water content is evaporated by the heat of fermentation. Accordingly, a feed composition can be obtained with the required water content. The final target water content of the feed composition should be 30 wt % or less, preferably 20 wt % or less, and more preferably 15 wt % or less. If the water content of the feed is higher than 30 wt %, then the total amount becomes excessive, causing difficulties in storage and transport. Additionally, it becomes less suitable for long-term storage, being susceptible to spoilage. The organic raw material which is dried in accordance with the present invention can be directly used as a feed composition.

Additionally, if the water content of the resulting feed composition needs to be further reduced, it can be dried using hot air from a steam heater or the like.

Furthermore, when the water content has dropped, preferably when the water content is about 20%, a raw material with a high water content can be added and stirred to adjust the water content to about 30% to continue fermentation, and this can be repeated several times.

Since the koji feed composition of the present invention contains lipolytic enzymes, it may contain oils, with the oil content being preferably at lest 5 wt %, more preferably at least 8 wt % with respect to the overall amount of the koji feed composition.

EXAMPLES

Herebelow, the present invention shall be described in detail by giving examples.

Example 1

100 kg of garbage from a restaurant was immersed in frying oil at about 105° C. for 120 minutes to obtain 20 kg of dry garbage with a water content of 7%. 7 kg of sterilized vegetable scraps were added thereto to adjust the water content to 36%. Next, this was added to 100 kg of koji, and mixed well. Heat was generated as soon as mixing began. This heat was controlled to an appropriate temperature (30–50° C.) by aerating as needed. 2–3 hours after addition of the koji, the growth of koji mold peaked, with the temperature of the mixture rising to 45° C. The production of koji was continued further, and hot air passed through a steam heater was blown in order to improve the efficiency of drying in the latter half of the koji production process. As a result, a fermented product (feed) with a water content of 10% was obtained 24 hours after addition to the koji. No malodorous fumes were issued during the entire procedure.

Example 2

100 kg of garbage from a restaurant was immersed in frying oil at about 105° C. for 10 minutes for sterilization. This was added to 600 kg of wheat bran koji with a water content of 15%, then stirred to make the water content 25%. 30 minutes later, the heat of fermentation from the koji mold began to gain intensity, and aeration was performed as appropriate to maintain the product temperature at 40° C., to obtain 615 kg of koji feed composition with a water content of 15% 24 hours after production of the koji. This treatment was continued for 1 month to obtain 650 kg of koji with a water content of 15% 1 month later. Absolutely no malodorous fumes were issued during the treatment, nor was there any contamination from stray microbes.

Example 3

The feed composition of the present invention was intermixed in an amount of 15% with a conventional standard feed composition, and fed to Berkshire pigs, which were compared with Berkshire pigs fed on only the standard feed composition. The pigs fed the present feed composition exhibited increased body weight over those fed the conventional feed composition.

Example 4

Additionally, the present feed composition was fed to egg-laying chickens. Whereas the egg-laying rate of egg-laying chickens normally decreases after one year from beginning to lay eggs, chickens fed on a diet composed by 50% of the present feed composition maintained a stable egg-laying rate exceeding one year, and the effect became more pronounced with higher rates of mixture of the present feed composition.

Example 5

Next, an experiment was performed concerning the lipolytic activity of koji mold.

266 g of steam-sterilized raw garbage were mixed with 500 g of wheat bran koji to adjust the water content to 35.4%. 25 g of edible waste oils were further added. The resulting oil content was 7.2%. Since the product temperature rose immediately after mixture, aeration was performed as appropriate to maintain the product temperature to 40° C. or less, whereupon 507.7 g of a koji feed composition with a water content of 14% and an oil content of 8.1% was obtained 24 hours later.

While the oil content of the koji immediately after mixture of the raw garbage and waste oils was 7.2%, it had changed to 8.1% 24 hours later. A calculation in terms of absolute quantities yields an oil content immediately after mixture of (500+291)×7.2%=57 g of oils. On the other hand, after 24 hours of koji production, the oil content had declined to 507.7×8.1%=41 g. During this time, the water content had decreased from 766×35.4%=271 ml to 507.7× 14%=71 ml. That is, this indicates that 57−41=16 g of waste oils were consumed in the process of evaporating 271−71=200 ml of water. That is, this demonstrates that in order to evaporate 200 ml of water with the heat of fermentation of koji, 8% of the water content, in other words, 16 g of waste oils are necessary.

Furthermore, while the iodine value of the waste oils prior of koji production was 265, the iodine value of the contained oils after 24 hours of koji production had been reduced to 151. This implies that the unsaturated fatty acids in the waste oils were largely broken down by the activity of the koji mold.

Example 6

Experiment on Drying Efficiency When Using Oils

A shochu effluent was used to compare the thermal drying which is used conventionally with drying by the heat of fermentation of koji mold using waste oils as in the present invention.

Method 9 tons of shochu effluent were mixed with 18 tons of wheat bran, and the water content was adjusted to 36%, then sterilized for 60 minutes at 100° C. using steam. After sterilization, this mixture of wheat bran and shochu effluents (which shall subsequently be referred to as effluent koji) was aerated to lower the product temperature to 40° C., after which 18 g of a seed koji (*Asp. kawachii*) were added and stirred for 1 hour, followed by further aeration to lower and maintain the temperature at 32° C. 12hours after addition of the seed koji, the growth of the koji mold caused the product temperature of the effluent koji to rise to at least 35° C., after which the product temperature was maintained within a range of 30–35° C. by aerating as needed to produce koji. As a result, the effluent koji had dried to a water content of 15% or less 120 hours after addition of the seed koji.

Subsequently, 3 tons of shochu effluent and 150–300 l of edible waste oils were added to the effluent koji to raise the water content to 26%. Furthermore, the effluent koji consumed the energy from the edible waste oils, causing the heat generation to become more intense. In order to maintain the product temperature to 30–35° C., appropriate aeration was performed, whereupon the effluent koji lost heat due to evaporation by aeration, thus lowering the product temperature while simultaneously evaporating the water content. As a result, the water content of the koji had been reduced to 15% once again after 24 hours. Subsequently, this operation was repeated, and in the end, 210 tons of shochu effluents and 1450 l of edible oils had been added to obtain 21 tons of effluent koji.

This effluent koji was analyzed for its components, while on the other hand, 15 g of koji were used to perform an extraction for 1 hour at 30° C. in 100 ml of water. The extract was used to determine titer values for various enzymes, to compute the enzymatic activity per gram of koji.

The results are shown below.

Raw Material Used

| | |
|---|---|
| Wheat Bran | 18000 kg |
| Shochu Effluent | 210000 l |
| Edible Waste Oils | 14500 l |

Power Used
 21554.6 kW

Effluent Koji Produced
 21,000 kg

| Comparison of Components | | |
|---|---|---|
| | Wheat Bran | Shochu Effluent |
| Water Content | 11.3% | 24.2% |
| Crude Protein | 15.7% | 30.1% |
| Crude Fat | 4.0% | 11.7% |
| Crude Fiber | 9.3% | 10.2% |
| Ash Content | 5.1% | 7.4% |
| NFE | 54.6% | 16.4% |

| Enzymatic Activity per Gram of Effluent Koji | |
|---|---|
| Glucoamylase | 4.12 U/g |
| α-glucosidase | 0.25 U/g |
| α-amylase | 4.51 U/g |
| Acidic protease | 1885 U/g |
| Lipase | 40.0 U/g |
| Phytase | 15.1 U/g |
| Peroxide Value | 11.4 ppm |

Analysis

The water content of the wheat bran used as the culture for the koji mold was 18000×11.3%=2034 l, the water content in the 210 tons of added shochu effluent was 210000× 95%=199500 l, and the water content in the 21 tons of the produced effluent koji was 21000×24.2%=5082 l, which means that 199500+2034−5082=196452 l of water were evaporated by the heat of fermentation.

On the other hand, the amount of edible waste oils used as the heat source was 14500 l (specific gravity 0.92)=13340 kg. Additionally, the oil content in the wheat bran used as a culture was 1800×4%=72 kg, and the oil content in the resulting effluent koji was 21000×11.7%=2457 kg. Therefore, 72+13340−2547=10865 kg of waste oil were consumed.

Furthermore, the amount of NFE contained in the original wheat bran was 18000×54.6%=9828 kg, and this was reduced in the final effluent koji stage to 21000×16.4%=3444 kg. That is, 9828−3444=6384 kg of NFE were consumed in the fermentation stage. This consume NFE is assumed to have been mostly starch in view of the properties of koji mold.

The energy value of the edible waste oils was 9500 kcal and the energy value of the starch was 4371 kcal.

Calculating the amount of energy consumed from the above results in the following:

| | |
|---|---|
| Edible Waste Oils | 10865 kg × 9500 kcal = 103,217,500 kcal |
| Starches | 6484 kg × 4371 kcal = 27,904,464 kcal |
| Total | 131,121,964 kcal |

On the other hand, the latent heat of vaporization of 1 l of water at 40° C. is 576 kcal. Since 1964521 of water were evaporated in this experiment, the latent heat of vaporization which is required is 576×196,452=113,156,352 kcal.

Thus, the thermal energy usage efficiency of the current process is 113,156,352/131,121,964=86.3%, a high rate of efficiency which would be unthinkable in conventional thermal drying.

Additionally, the effluent koji contains phytases and acidic proteases which, when fed to livestock, can be expected to have the possibility of improving the efficiency of use of phytic phosphorus and proteins.

Example 7

In order to test the effects of the present invention, a component analysis was performed on the koji feed composition, and the meat quality of livestock fed on the koji feed composition was inspected.

1 kg of raw garbage was introduced into 3 liters of frying oil held at a temperature of 103° C., then dried for 24 hours. Then, the product was extracted from the frying oil and pressed to obtain 260 g of dry product. The dry product contained 60 g of oils. 146 ml of water was added to this dry product to adjust the water content to 36%, and 0.4 g of seed koji were added and stirred. After 6 hours, the product temperature began to rise, so stirring was accompanied by aeration as appropriate to maintain the temperature at 36° C., and 40 hours later, 275 g of a koji with a water content of 15% was obtained. The oil content of the koji was 17%. That is, 60 g of oils had been reduced to 275×17%=46.8 g, thus indicating that about 20% of the oils had been broken down by the koji mold. A compositional analysis of this koji found that the water content was 15%, crude proteins 16%, crude fats 17%, crude fiber 6%, ash content 4% and NFE 42%.

This koji was used as a feed composition which was fed to Berkshire pigs from the age of 3 months after birth, by replacing 20% of the conventional feed composition. While Berkshire pigs normally grow to a body weight of about 110 kg by 8 months after birth, those undergoing the present experiment had reached a body weight of 110 kg by the age of 6.5 months. Furthermore, while mature pigs normally eat 3 kg of feed a day and excrete 6 kg of manure, the pigs in the present test only excreted 1.8 kg of manure. That is, it was clear that this koji is very effective as a feed composition, and is capable of promoting digestive absorption. Additionally, conventionally, if pigs are fed feed having a high oil content such as food scraps, their fat portions can yellow and cause reduced meat quality, but in the present experiment, such yellowing was not observed at all.

As is clear from the above examples, whereas feed compositions composed of raw garbage could conventionally only serve as an inferior substitute for normal feed, the feed composition of the present invention has exceptional effects which far exceed the capabilities of conventional feed compositions.

What is claimed is:

1. A method for producing a koji feed composition comprising the steps of:
   immersing at least a portion of an organic raw material in heated oil;
   extracting the immersed at least one a portion of an organic raw material from the heated oil, the whole of the organic raw material having a total oil content and a total water content, wherein the total water content of the organic raw material is at least 25% and not more than 40%, and wherein if the total oil content of the organic raw material is below 3% with respect to the total water content of the organic raw material, said total oil content of the organic raw material is adjusted to be at least 3% with respect to the total water content of the organic raw material;
   adding koji to said organic raw material to ferment said organic raw material; and
   reducing the total oil content of said organic raw material to a predetermined amount by fermentation of said organic raw material by the koji mold.

2. A method for producing a koji feed composition according to claim 1, wherein upon extraction of the immersed at least one portion of an organic raw material the organic raw material contains a sufficient amount of oils to generate heat from fermentation by the koji mold sufficient to dry the organic raw material.

3. A method for producing a koji feed composition in accordance with claim 1, wherein the koji feed composition contains lipolytic enzymes from the koji.

4. A method for producing a koji feed composition in accordance with claim 1, wherein oils are absorbed into at least the area around the entire surface of the organic raw material.

5. A method for producing a koji feed composition in accordance with claim 1, wherein the organic raw material is raw garbage.

6. A method for producing a koji feed composition in accordance with claim 1, wherein the heated oils are heated to a temperature of at least 70° C.

7. A method for producing a koji feed composition in accordance with claim 1, wherein the koji mold has lipolytic activity.

8. A method for producing a koji feed composition containing oils and lipolytic enzymes, comprising steps of:
   immersing at least a portion of an organic raw material in heated oil;
   extracting the immersed at least a portion of an organic raw material from the heated oil, the whole of the organic raw material having a total oil content and a total water content, wherein the total water content of the organic raw material is at least 25% and not more than 40%, and wherein if the total oil content of the organic raw material is below 3% with respect to the total water content of the organic raw material, said total oil content of the organic raw material is adjusted to be at least 3% with respect to the total water content of the organic raw material; and adding koji to said organic raw material to ferment said organic raw material.

9. A production method in accordance with claim 8, wherein the oil content is at least 5 wt %, preferably at least 8 wt % with respect to the total amount of the koji feed composition.

10. A production method in accordance with claim 8, wherein the water content of the koji feed composition is at most 30 wt %.

11. A production method in accordance with claim 8, wherein the lipolytic enzymes are from the koji.

12. A method for producing a koji feed composition in accordance with claim 1, wherein heat from the fermentation is used to reduce the water content of the organic raw material.

13. A method of producing a koji feed composition in accordance with claim 1, wherein after extraction of the immersed at least one portion of an organic raw material the whole of the organic raw material has a total oil content of at least five wt % of oils with respect to the total water content of the organic raw material.

14. A method of producing a koji feed composition in accordance with claim 1, wherein after extraction of the immersed at least one portion of an organic raw material the whole of the organic raw material has a total oil content of at least ten wt % of oils with respect to the total water content of the organic raw material.

* * * * *